T. F. Hammer,
Friction Clutch.
Nº 48,769.  Patented July 11, 1865.
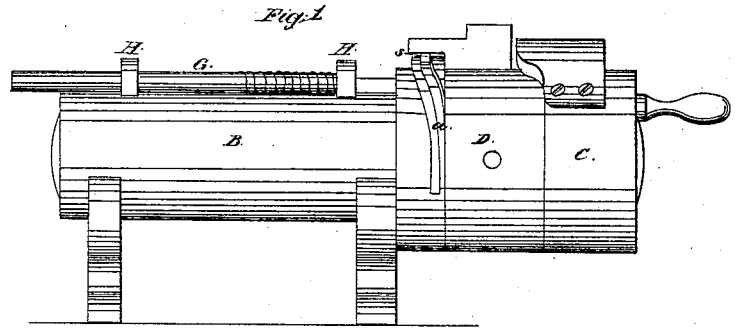
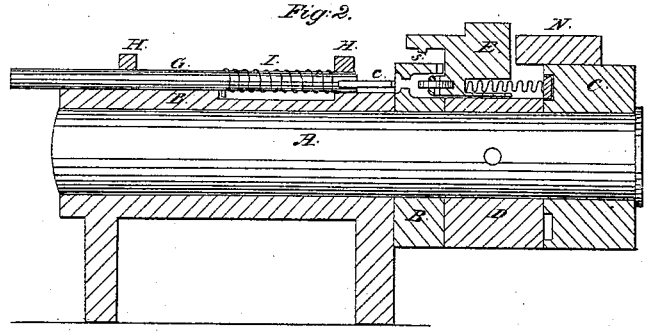
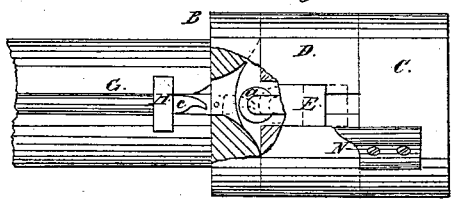
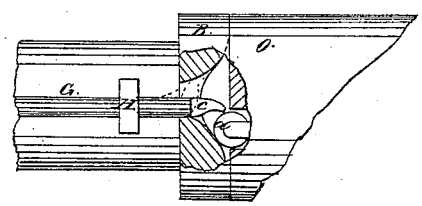
Witnesses:
Mary A. Hine
Rufus H. Sanford
Inventor
T. F. Hammer
By his Atty.
John E. Earle

UNITED STATES PATENT OFFICE.

T. F. HAMMER, OF BRANFORD, ASSIGNOR TO GILBERT J. HINE, OF NEW HAVEN, CONNECTICUT.

IMPROVEMENT IN MACHINERY-CLUTCHES.

Specification forming part of Letters Patent No. 48,769, dated July 11, 1865.

*To all whom it may concern:*

Be it known that I, T. F. HAMMER, of Branford, in the county of New Haven and State of Connecticut, have invented a new and Improved Machinery-Clutch; and I do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a longitudinal central section; Figs. 3 and 4, top views, partially broken to illustrate the operation.

My invention relates to an improvement in a clutch for connecting or disconecting power from machinery, and is designed to disconnect so that but one revolution can be performed without disconnection, and is especially adapted to use in power and other presses used for punching or swaging purposes.

To enable others skilled in the art to construct and operate my improved clutch, I will proceed to fully describe the same as illustrated in the accompanying drawings.

A is the driving shaft, supported in a bearing, B.

C is a portion of the pulley or wheel to which power is applied, and revolves loosely on the shaft A. Back of the said pulley C, and fixed to and so as to revolve with the shaft A, is the clutch-block D. E is the clutch, constructed so as to slide in the said clutch-block. It is held back from the pulley C by means of the spring F. (See Fig. 2.) On the inner end of of the said clutch F is fixed a wheel, *a*. A recess is made in the face of the bearing B, as seen in Figs. 3 and 4, in which the said wheel stands when at rest, to permit the catch N on the pulley *c* to pass the clutch E.

G is a rod, movable in bearings H H, for the purpose of operating the clutch E to connect with the pulley C, and is held back in the position denoted in black by means of the spring I. In the outer end of the said rod G is fixed a tongue, *c*. (Seen in Figs. 3 and 4.) When at rest the clutch E stands back in the position denoted in Fig. 3. If desired to connect with the revolving pulley C, force the rod G from the position in black to that denoted in red, Fig. 3, in which movement the tongue *c* will strike the face of the wheel *a* centrally and force the clutch E outward, as also denoted in red, against which the catch N will strike, and, revolving, cause the clutch-block and shaft to revolve with it, as with ordinary clutches. The tongue, being held against the wheel, will hold the clutch in connection until the wheel shall have passed from the recess in the face of the bearing, when it will roll around upon the face until it is about completing its revolution, when a stud or pin, *s*, projecting from the clutch, will enter an inclined groove, *d*, on the bearing, (see Fig. 1,) which will withdraw the clutch from the pulley, as seen in Fig. 1, the wheel *a* again entering the recess in the face of the bearing. Should the rod G be retained in the position denoted in red, Fig. 3, the wheel would strike the tongue and throw it over to the position denoted in red, Fig. 4, and the clutch could not be again connected with the pulley until the rod had been permitted to return. In returning, the tongue would be drawn again into the position denoted in black, Fig. 3, and then would remain until again forced forward by the operation to connect the clutch with the pulley, as before described, when the clutch would be carried round another full revolution, as before, but no more, performing simply one revolution at the pleasure of the operator, and automatically disconnecting itself from the action of the power when each full revolution is complete.

Having, therefore, thus fully described my invention, what I claim as new and useful, and desire to secure by Letters Patent, is—

1. The combination of the clutch E and bar G, when constructed and arranged with the tongue *c*, or its equivalent, to operate in the manner and for the purpose specified.

2. The combination and arrangement described of the clutch E, inclined groove *d*, and tongue *c*, substantially as and for the purpose specified.

T. F. HAMMER.

Witnesses:
J. E. EARLE,
MARY A. HINE.